Figure 5:
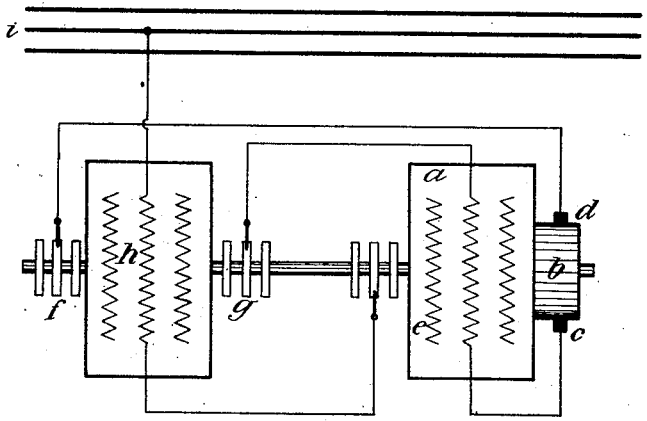

May 29, 1923.
O. TÜRK ET AL
1,456,658
ALTERNATING CURRENT COMMUTATOR MOTOR
Filed Oct. 29, 1915    2 Sheets-Sheet 1
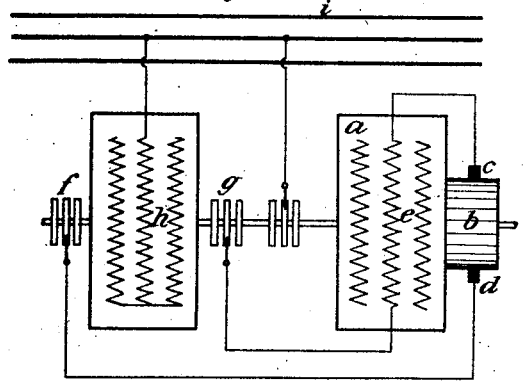
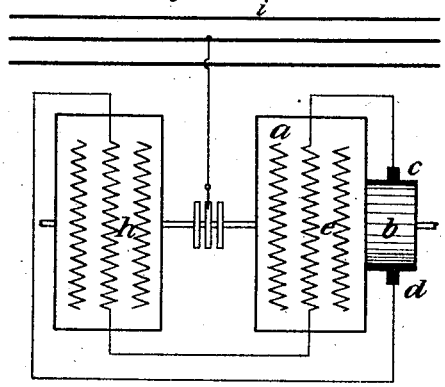
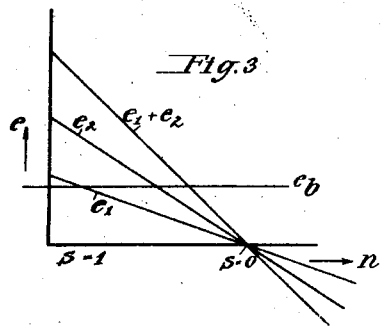
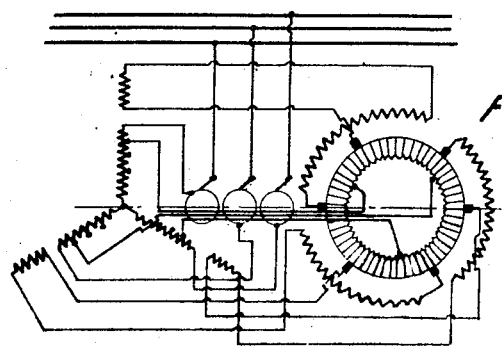
Inventors:
Otto Türk & Jaroslav Kozicek
By Knight Bros
their Attorneys May 29, 1923.

O. TÜRK ET AL 1,456,658

ALTERNATING CURRENT COMMUTATOR MOTOR

Filed Oct. 29, 1915  2 Sheets-Sheet 2

Patented May 29, 1923.

1,456,658

UNITED STATES PATENT OFFICE.

OTTO TÜRK AND JAROSLAV KOZISEK, OF CHARLOTTENBURG, NEAR BERLIN, GERMANY, ASSIGNORS TO SIEMENS-SCHUCKERT WERKE G. M. B. H., OF BERLIN, GERMANY, A CORPORATION OF GERMANY.

ALTERNATING-CURRENT COMMUTATOR MOTOR.

Application filed October 29, 1915. Serial No. 58,679.

*To all whom it may concern:*

Be it known that we, OTTO TÜRK and JAROSLAV KOZISEK, citizens of the Austrian Empire, and both residing at Charlottenburg, near Berlin, Germany, have invented certain new and useful Improvements in Alternating-Current Commutator Motors, of which the following is a specification.

This invention relates to an arrangement for lessening the output of the commutators of multiphase, shunt-wound, commutator machines, in which the total energy is supplied to the rotor.

In ordinary multiphase alternating current, commutator, shunt motors, in which the total energy is supplied to the rotor by way of slip rings, the output per pole is limited by the conditions of commutation. The conditions of commutation are dependent upon the transformer tension which is independent of the slip of the motor. Consequently, these motors have a maximum output which per pole is dependent solely upon the transformer voltage regardless of the speed of rotation. Since the output of these motors cannot be increased without also increasing the transformer voltage, it is necessary, whenever it is desired to obtain a greater output of the motor, either to increase the number of poles, which however, leads to low speed types of low electrical efficiency, or the number of machines must be increased. In addition, the commutators can be built only for limited voltages, and it is preferable not to apply a very high voltage to the rotor in order to insure reliable operation. When the required voltage of the system is high, for instance, a special transformer is required.

One of the principal objects of this invention is to provide a group of machines in which these difficulties are avoided.

According to the invention only part of the energy taken from the system is supplied to the commutator machine, the other part being supplied to the inducing part of an asynchronous machine which is driven synchronously (preferably by direct coupling, the number of poles being equal) with the shunt commutator machine.

To this and other ends the invention consists in the construction, arrangement and combination of parts described hereinafter and pointed out in the claims.

Several illustrative embodiments of the invention are diagrammatically represented in the accompanying drawings, in which an example of multiphase alternating current machines three phase machines are shown, without, however, limiting the invention to this particular type of machines.

In these drawings,

Fig. 1 is a diagram showing a set of machines arranged according to the invention, Fig. 2 is a diagram showing a set of machines arranged in a different manner according to the invention, Fig. 3 is a voltage diagram explained hereinafter, and Figs. 4 to 7 are diagrams showing a set of machines connected in various different ways according to the invention.

Referring to Fig. 1, $a$ designates the three phase alternating current, shunt wound commutator machine which for the sake of simplicity is represented connected for single phase, and $b$ denotes its commutator having the brushes $c$ and $d$. The circuit of the brushes and the induced winding $e$ of the commutator machine has connected into it the induced winding, in the illustrative embodiment the rotor winding, of the asynchronous macihne $h$ over the slip rings $f$ and $g$. The inducing part of the asynchronous machine $h$ is connected to the alternating current system $i$.

The arrangement illustrated in Fig. 1 can be simplified when the rotor winding is used as the inducing part of the asynchronous machine and the stator winding as the induced part. As illustrated in Fig. 2 the energy of the system is supplied to both machines over joint slip rings.

The operation of the machines arranged as described will be understood from the following:—

If $e_n$ is the voltage applied over the slip rings to the rotors of both machines, the voltage $e_1$ of the commutator machine induced in the stator will be $e_1 = s.e_n.c_1$, when $s$ denotes the slip and $c_1$ a machine constant which substantially depends on the ratio of transformation. Likewise, if $e_2$ is the voltage produced in the stator of the asynchronous machine, then $e_2 = s.e_n.c_2$, when $c_2$ is also a machine constant. If the voltages $e_1$ and $e_2$ are plotted with reference to the number of revolutions two straight lines are obtained which cut the abscissa at the point $s=0$, as shown in the diagram Fig. 3. The brush voltage $e_b$ is also drawn in this diagram, this brush voltage being in an exactly predetermined ratio to the voltage of the system depending on the position of the brushes. The speed of the set of machines will change until the brush voltage is equal to the sum of the induced voltages in the two machines.

$$e_b = e_1 + e_2 = s_1 . e_n (c_1 + c_2).$$

This slip $s$ corresponds to a speed which is represented by the point of intersection of the voltage characteristic $e_1 + e_2$ with the straight line $e_b$. It thus follows from the diagram that the entire set of machines behaves exactly like the commutator shunt machine alone. The asynchronous machine obtains one part of its output directly from the system, and itself works with the characteristic of the shunt-wound machine and thus behaves like a part of the commutator machine itself.

The fraction of the output which it takes over depends, as in the case of all machines connected in series, on the ratio of the voltage induced in it to the voltage induced in the commutator machine. By suitably selecting this ratio of voltage it is quite possible to obtain from the asynchronous machine any predetermined electrical or mechanical output. The total output of the set is thus considerably increased without its having been necessary to conduct the increase in output over the commutator.

As will be understood from the diagram Fig. 3 the slip can be given any assumed value by suitably selecting the voltage $e_1$ or $e_2$ or both or by suitably selecting the portion of the brushes. As the ratio of the voltages $e_1$ and $e_2$ changes, so the distribution of work over the two machines also changes correspondingly. This voltage can be regulated by changing the field connecting transformers either into the rotor circuit or into the stator circuit or into both. A particularly favorable arrangement is obtained when the stator winding connections are arranged so that they can be reversed. The set of machines can be regulated in a particularly suitable manner when the number of the operative turns is first varied for the rough adjustment and then the brushes are shifted for the fine adjustment.

The set as such can be started in various ways. It is of particular advantage to start it from the commutator side alone and to connect the asynchronous machine when synchronism exists.

Additional advantages, however, are gained from the new arrangement. Heretofore shunt motors have preferably not been connected in systems having very high voltages because, on account of the necessary commutator, the security of service is impaired. In the new set of machines hereinafter described the high voltage of the system can be applied over the slip rings of the asynchronous machine because this course can be adopted without danger, and the voltage for the commutator machine can be taken from tapping points on the winding of the asynchronous machine. Fig. 4 diagrammatically shows such an arrangement. By means of the new arrangement it is thus possible for the commutator machine, which in itself operates under difficult conditions, to operate satisfactorily in every respect, and on the other hand, to obtain from the set an output of any desired value with a wide range of regulation. The advantages of the asynchronous machine and the commutator machine are thus combined without their inherent disadvantages.

In the last described example a shunt characteristic of the set of machines is obtained by directly or indirectly applying to the inducing windings of both machines the voltage of the system. A series characteristic of the two machines can be obtained by connecting their inducing windings in series and thus supplying the energy to them in series. Some additional examples of the invention are represented in Figs. 5 to 7.

Referring to Fig. 5, in this embodiment the energy of the system is supplied to one end of the stator winding $h$ of the asynchronous machine, whilst the other open end is connected with the rotor of the shunt commutator machine $a$. The rotor of the asynchronous machine is connected into the brush and stator circuit $c$, $d$, $e$ of the shunt machine over the slip rings $f$ and $g$. This arrangement shown in Fig. 5 can be simplified by supplying the energy of the system, as represented in Fig. 6, to the rotor slip rings of the asynchronous machine, connecting the rotors of the two machines in series and closing the stator and brush circuit of the shunt commutator machine over the stator circuit of the asynchronous machine. In this arrangement only three slip rings are required, whereas the embodiment shown in Fig. 5 comprises nine.

Figure 6:
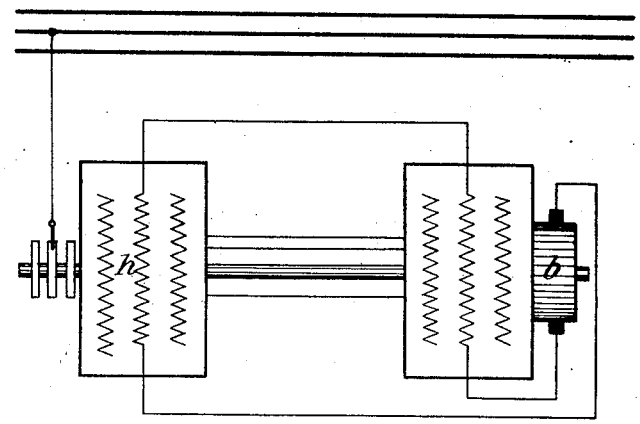
Figure 7:
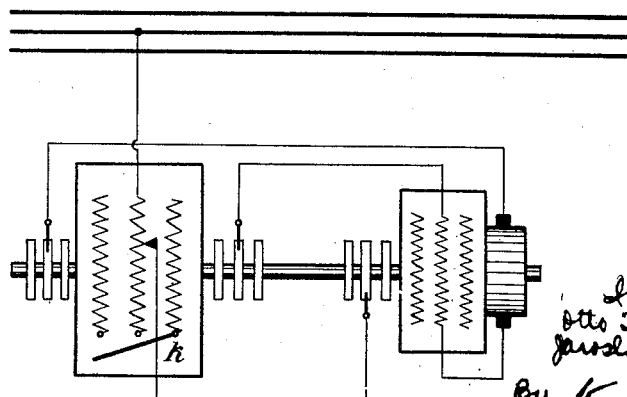

The two rotors of the arrangement shown in Fig. 6 can be connected in series either by breaking the neutral point of the two rotors and connecting the two rotors with one another over three lines, or by employing common rotor bars for the two machines. In this manner a structurally compact and simple form is obtained.

Owing to the series connection of the inducing windings of the two machines, in the case of hypersynchronism a series characteristic of the set of machines is obtained, i. e., the speed decreases as the load increases. In the case of hypersynchronism, on the contrary, a peculiar behaviour of the set obtains inasmuch as the speed increases with the torque.

The characteristic of the set can be changed in a simple manner from series to shunt by closing the neutral point of the inducing winding of the first machine and connecting the inducing winding of the second machine to tapping points of the inducing winding of the first machine. This change of the arrangement shown in Fig. 5 is represented in Fig. 7, in which embodiment the short-circuiting device $k$ is used for making the neutral point for the first machine. The same arrangement can also be made in the set shown in Fig. 6. In this case, however, convenient regulation is not readily possible because a separate set of slip rings is required for each regulating step.

We claim:—

1. In combination an asynchronous machine having a wound rotor and a wound stator, a commutator machine mechanically coupled to said asynchronous machine and having a wound rotor and brushes resting on its commutator and having a wound stator, slip rings rotating with said asynchronous machine and an alternating current supply line connected to said slip rings, connections from the slip rings to the asynchronous machine rotor and connections from the latter to the commutator machine rotor, and circuits including the stator windings of both machines and said brushes.

2. In combination an asynchronous machine having a wound rotor and a wound stator, a commutator machine mechanically coupled to said asynchronous machine and having a wound rotor and brushes resting on its commutator and having a wound stator, slip rings rotating with said asynchronous machine and an alternating current supply line connected to said slip rings, connections from the slip rings to the asynchronous machine rotor and variable connections from the latter to the commutator machine rotor, and circuits including the stator windings of both machines and said brushes.

3. In combination a three-phase asynchronous machine having a wound rotor and a wound stator, a commutator machine mechanically coupled to said asynchronous machine and having a wound rotor and brushes resting on its commutator and having a wound stator, slip rings rotating with said asynchronous machine and a three-phase alternating current supply line, each of its phases being connected to one of said slip rings, a connection from each of said slip rings to one of the phases of the asynchronous machine rotor and a variable connection from each of said rotor phases to the rotor of the commutator machine, and circuits including the stator windings of both machines and said brushes.

OTTO TÜRK.
JAROSLAV KOZISEK.